United States Patent
Kim et al.

(10) Patent No.: US 11,967,322 B2
(45) Date of Patent: Apr. 23, 2024

(54) SERVER FOR IDENTIFYING FALSE WAKEUP AND METHOD FOR CONTROLLING THE SAME

(71) Applicant: Samsung Electronics Co., Ltd., Suwon-si (KR)

(72) Inventors: Sunok Kim, Suwon-si (KR); Sunbeom Kwon, Suwon-si (KR); Soonhee Jo, Suwon-si (KR); Kiwan Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 17/569,994

(22) Filed: Jan. 6, 2022

(65) Prior Publication Data

US 2022/0358918 A1 Nov. 10, 2022

Related U.S. Application Data

(63) Continuation of application No. PCT/KR2021/019212, filed on Dec. 16, 2021.

(30) Foreign Application Priority Data

May 6, 2021 (KR) .................. 10-2021-0058837

(51) Int. Cl.
*G10L 15/06* (2013.01)
*G10L 15/08* (2006.01)
(Continued)

(52) U.S. Cl.
CPC ............ *G10L 15/22* (2013.01); *G10L 15/083* (2013.01); *G10L 15/30* (2013.01); *G10L 21/028* (2013.01)

(58) Field of Classification Search
CPC ......... G10L 15/22; G10L 15/10; G10L 15/28; G10L 15/30; G10L 15/083; G10L 21/028; G10L 2015/088; G10L 15/07
(Continued)

(56) References Cited

U.S. PATENT DOCUMENTS

| 2006/0058998 | A1 | 3/2006 | Yamamoto et al. |
| 2014/0172426 | A1 | 6/2014 | Aratsu et al. |

(Continued)

FOREIGN PATENT DOCUMENTS

| EP | 1 290 678 | 12/2001 |
| JP | 2006-084875 A | 3/2006 |

(Continued)

OTHER PUBLICATIONS

International Search Report and Written Opinion dated Mar. 17, 2022, issued in International Patent Application No. PCT/KR2021/019212.

*Primary Examiner* — Md S Elahee
(74) *Attorney, Agent, or Firm* — Jefferson IP Law, LLP

(57) ABSTRACT

A server is provided. The server includes a communication circuitry, and at least one processor operatively connected with the communication circuitry. The at least one processor may be configured to, in response to traffic of a plurality of speeches to wake up a voice assistant feature, received within a preset period being a preset value or more, generate a plurality of clusters based on similarities between the plurality of speeches, and determine whether to respond to each of speeches included in each of the plurality of clusters based on similarities between the speeches included in each of the plurality of clusters.

20 Claims, 11 Drawing Sheets

(51) Int. Cl.
*G10L 15/22* (2006.01)
*G10L 15/30* (2013.01)
*G10L 21/028* (2013.01)

(58) Field of Classification Search
USPC ........................................................ 704/245
See application file for complete search history.

(56) References Cited

U.S. PATENT DOCUMENTS

| | | | |
|---|---|---|---|
| 2016/0358600 A1* | 12/2016 | Nallasamy | G10L 15/07 |
| 2017/0031420 A1 | 2/2017 | Wong et al. | |
| 2018/0330728 A1 | 11/2018 | Gruenstein et al. | |
| 2019/0139547 A1 | 5/2019 | Wu et al. | |
| 2019/0274103 A1 | 9/2019 | Gan et al. | |
| 2020/0013390 A1 | 1/2020 | Wang et al. | |
| 2020/0027462 A1 | 1/2020 | Wang et al. | |
| 2020/0035249 A1 | 1/2020 | Choi et al. | |
| 2020/0279558 A1 | 9/2020 | Li et al. | |
| 2021/0097995 A1 | 4/2021 | Sarkar et al. | |
| 2021/0193153 A1 | 6/2021 | Jung | |

FOREIGN PATENT DOCUMENTS

| | | |
|---|---|---|
| KR | 10-2013-0091918 A | 8/2013 |
| KR | 10-2019-0077536 A | 7/2019 |
| KR | 10-2019-0106943 A | 9/2019 |
| KR | 10-2019-0134594 A | 12/2019 |
| KR | 10-2019-0137863 A | 12/2019 |
| KR | 10-2020-0024068 A | 3/2020 |
| KR | 10-2020-0029314 A | 3/2020 |
| KR | 10-2093851 B1 | 3/2020 |

* cited by examiner

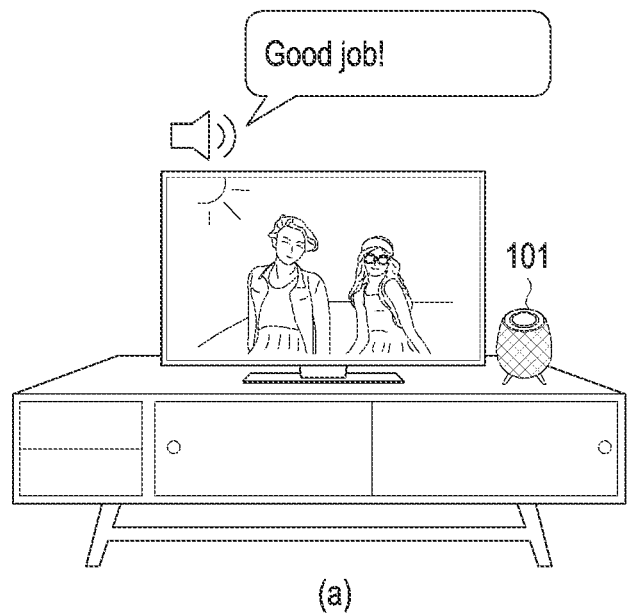
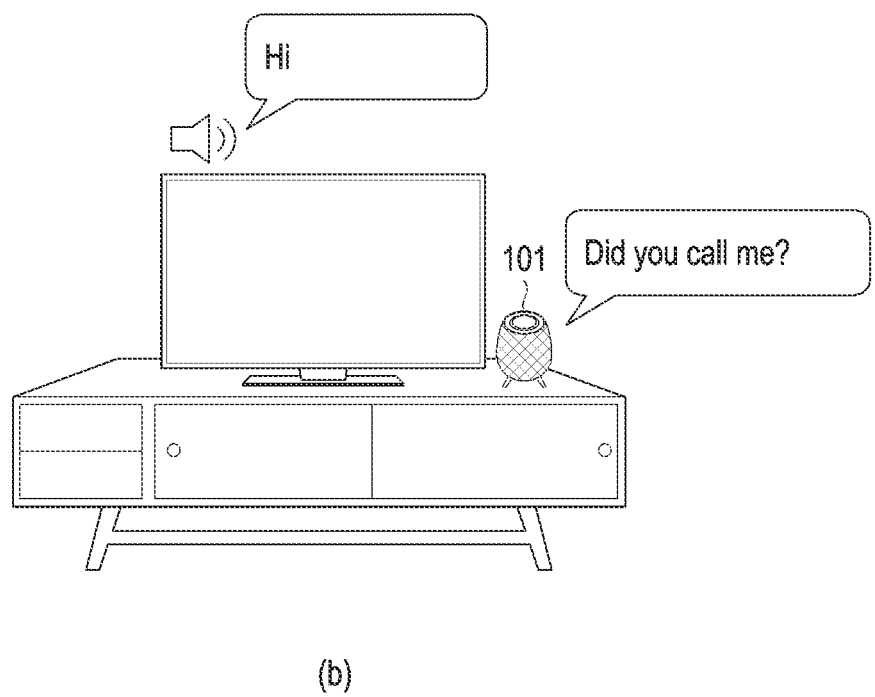
FIG.13

SERVER FOR IDENTIFYING FALSE WAKEUP AND METHOD FOR CONTROLLING THE SAME

CROSS-REFERENCE TO RELATED APPLICATION(S)

This application is a continuation application, claiming priority under § 365(c), of an International application No. PCT/KR2021/019212, filed on Dec. 16, 2021, which is based on and claims the benefit of a Korean patent application number 10-2021-0058837, filed on May 6, 2021, in the Korean Intellectual Property Office, the disclosure of which is incorporated by reference herein in its entirety.

BACKGROUND

1. Field

The disclosure relates to a server for identifying false wakeups and a method for controlling the same.

2. Description of Related Art

Nowadays various services using artificial intelligence (AI) assistants that provide responses to user speech inputs (e.g. Bixby™, Assistant™, or Alexa™) are provided.

An AI assistant may be launched by pressing a physical button or touching the display, as well as by speech recognition.

To summon an AI assistant by speech recognition, the electronic device monitors ambient sounds through an embedded low-power microphone and, upon detecting a trigger keyword speech, starts to work.

After waking up, the AI assistant may respond to the user by automatic speech recognition (ASR), natural language understanding (NLU), natural language generation (NLG), and text-to-speech technology.

The above information is presented as background information only to assist with an understanding of the disclosure. No determination has been made, and no assertion is made, as to whether any of the above might be applicable as prior art with regard to the disclosure.

SUMMARY

Sometimes, a false wakeup may occur, meaning that the AI assistant may unintentionally wake up even when the user doesn't speak a trigger keyword.

If noise with a similar pattern to that of the keyword or a specific pattern different from that of the keyword, which may be recognized as a speech or utterance, is entered through television (TV), personal computer (PC), or other media, a surge in usage may occur without known cause, and multiple devices may simultaneously wake up, causing inconvenience to the user.

Aspects of the disclosure are to address at least the above-mentioned problems and/or disadvantages and to provide at least the advantages described below. Accordingly, an aspect of the disclosure is to provide a server and method for controlling the same, which may identify false wakeup when massive speeches for wakeup are simultaneously received.

Additional aspects will be set forth in part in the description which follows and, in part, will be apparent from the description, or may be learned by practice of the presented embodiments.

In accordance with an aspect of the disclosure, a server is provided. The server includes a communication module, and at least one processor operatively connected with the communication module, and the at least one processor may be configured to, if traffic of a plurality of speeches to wake up a voice assistant feature, received within a preset period is a preset value or more, generate a plurality of clusters based on similarities between the plurality of speeches, and determine whether to respond to each of speeches included in each of the plurality of clusters based on similarities between the speeches included in each of the plurality of clusters.

In accordance with another aspect of the disclosure, a method for controlling a server is provided. The method includes, if traffic of a plurality of speeches to wake up a voice assistant feature, received within a preset period is a preset value or more, generating a plurality of clusters based on similarities between the plurality of speeches, and determining whether to respond to each of speeches included in each of the plurality of clusters based on similarities between the speeches included in each of the plurality of clusters.

According to various embodiments, an electronic device may wake up and provide a response only when an utterance intended by the user is entered, thus reducing false wakeup and waste of resources used for a response process due to false wakeup s.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a view illustrating a situation in which a response is provided upon a false wakeup according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
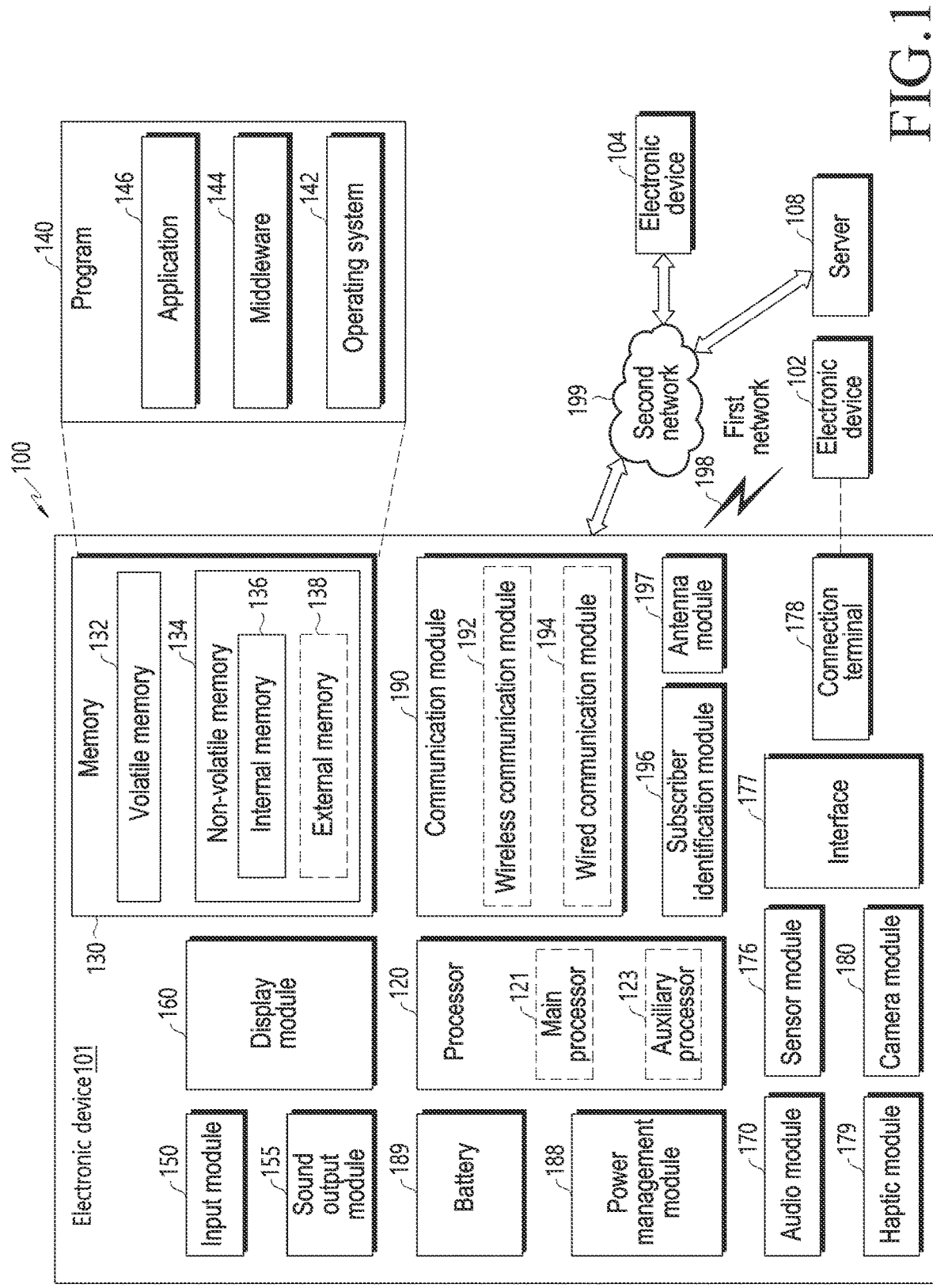
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5th generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
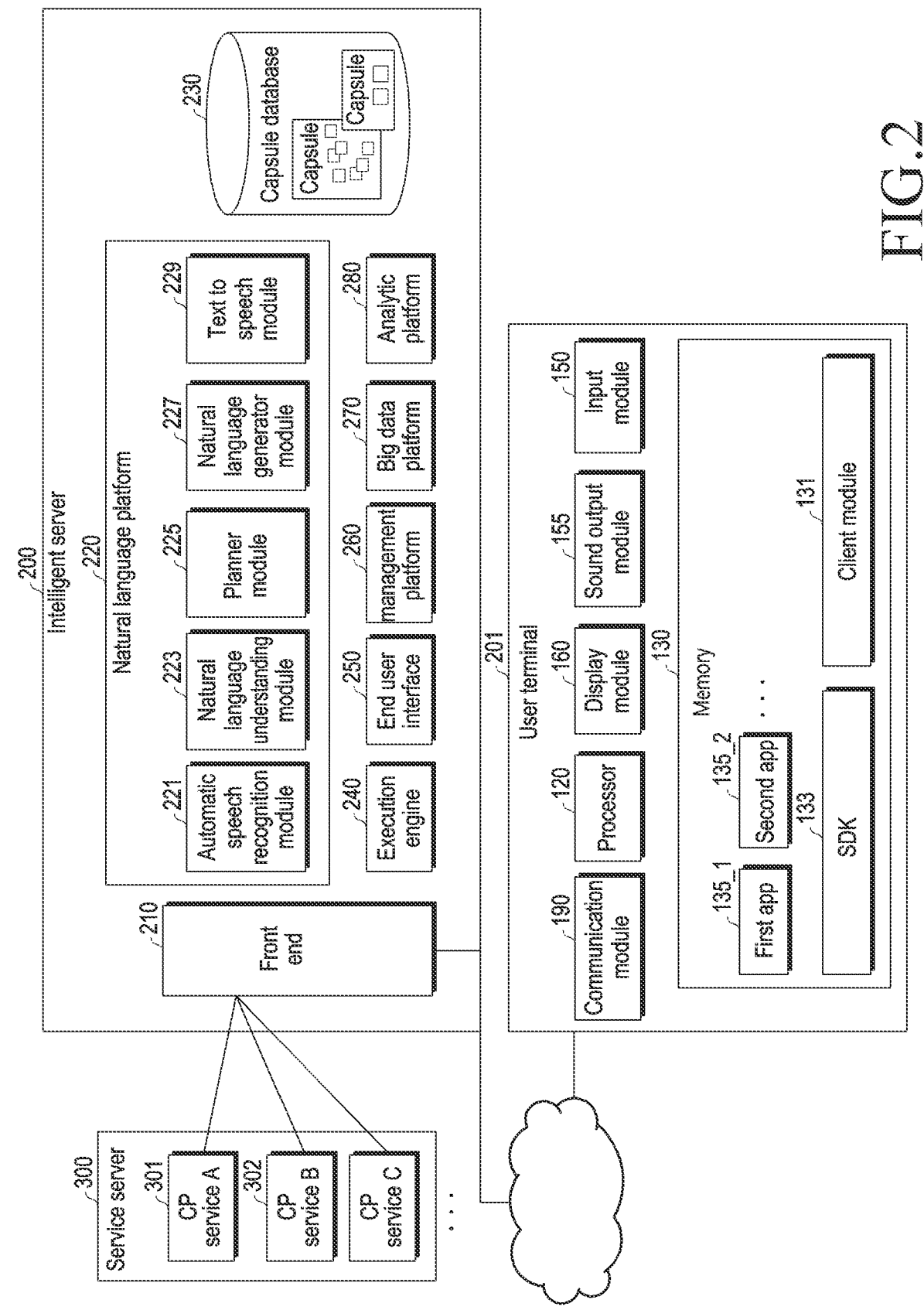
FIG. 2 is a block diagram illustrating an integrated intelligence system according to an embodiment of the disclosure.

FIG. 2 is a block diagram illustrating an integrated intelligence system according to an embodiment of the disclosure.

Referring to FIG. 2, according to an embodiment, an integrated intelligence system may include a user terminal 201, an intelligent server 200, and a service server 300.

According to an embodiment, the user terminal 201 (e.g., the electronic device 101 of FIG. 1) may be a terminal device (or electronic device) that may connect to the Internet, e.g., a mobile phone, smartphone, personal digital assistant (PDA), laptop computer, TV, home appliance, wearable device, head-mounted device (HMD), or smart speaker.

According to the shown embodiment, the user terminal 201 may include a communication module 190, a microphone (e.g., input module 150), a speaker (e.g., sound output module 155), a display module 160, a memory 130, or a processor 120. The above-enumerated components may be operatively or electrically connected with each other.

According to an embodiment, the communication module 190 (e.g., the communication module 190 of FIG. 1) may be configured to connect to an external device to transmit and receive data. According to an embodiment, the microphone (e.g., the input module 150 of FIG. 1) may receive a sound (e.g., the user's utterance) and convert the sound into an electrical signal. According to an embodiment, the speaker (e.g., the sound output module 155 of FIG. 1) may output an electrical signal as sound (e.g., speech). According to an embodiment, the display module 160 (e.g., the display module 160 of FIG. 1) may be configured to display images or videos. According to an embodiment, the display module 160 may display a graphic user interface (GUI) of an app (or application program) that is executed.

According to an embodiment, the memory 130 (e.g., the memory 130 of FIG. 1) may store a client module 131, a software development kit (SDK) 133, and a plurality of apps. The client module 131 and the SDK 133 may configure a framework (or solution program) for performing general-purpose functions. The client module 131 or SDK 133 may configure a framework for processing speech input.

According to an embodiment, the plurality of apps stored in the memory 130 may be programs for performing designated functions. According to an embodiment, the plurality of apps may include a first app 135-1 and a second app 135-3. According to an embodiment, each of the plurality of apps may include a plurality of actions for performing the designated function. For example, the apps may include an alarm app, a messaging app, and/or a scheduler app. According to an embodiment, the plurality of apps may be executed by the processor 120 (e.g., the processor 120 of FIG. 1) to sequentially execute at least some of the plurality of operations.

According to an embodiment, the processor 120 may control the overall operation of the user terminal 201. For example, the processor 120 may be electrically connected with the communication module 190, microphone (e.g., input module 150), speaker (e.g., sound output module 155), and display module 160 to perform designated operations.

According to an embodiment, the processor 120 may execute the program stored in the memory 130 to perform a designated function. For example, the processor 120 may execute at least one of the client module 131 or the SDK 133 to perform the following operations for processing speech input. The processor 120 may control the operation of the plurality of apps via, e.g., the SDK 133. The following operations described as operations of the client module 131 or SDK 133 may be operations according to the execution of the processor 120.

According to an embodiment, the client module 131 may receive a speech input. For example, the client module 131 may receive a speech signal corresponding to the user's utterance detected via the microphone (e.g., input module 150). The client module 131 may transmit the received speech input to the intelligent server 200 (e.g., the server 108 of FIG. 1). The client module 131 may transmit state information about the user terminal 201 along with the received speech input to the intelligent server 200. The state information may be, e.g., app execution state information.

According to an embodiment, the client module 131 may receive a result corresponding to the received speech input. For example, if the intelligent server 200 may produce the result corresponding to the received speech input, the client module 131 may receive the result corresponding to the received speech input. The client module 131 may display the received result on the display module 160.

According to an embodiment, the client module 131 may receive a plan corresponding to the received speech input. The client module 131 may display the results of execution of the plurality of operations of the app according to the plan on the display module 160. The client module 131 may sequentially display, e.g., the results of execution of the plurality of operations on the display. As another example, the user terminal 201 may display only some results of execution of the plurality of operations (e.g., the result of the last operation) on the display.

According to an embodiment, the client module 131 may receive a request for obtaining information necessary to produce the result corresponding to the speech input from the intelligent server 200. According to an embodiment, the client module 131 may transmit the necessary information to the intelligent server 200 in response to the request.

According to an embodiment, the client module 131 may transmit information resultant from executing the plurality of operations according to the plan to the intelligent server 200 (e.g., the server 108 of FIG. 1). The intelligent server 200 may identify that the received speech input has been properly processed using the result information.

According to an embodiment, the client module 131 may include a speech recognition module. According to an embodiment, the client module 131 may recognize the speech input to perform a limited function via the speech recognition module. For example, the client module 131 may perform an intelligence app to process the speech input to perform organic operations via a designated input (e.g., Wake up!).

According to an embodiment, the intelligent server 200 may receive information related to the user speech input from the user terminal 201 via a communication network. According to an embodiment, the intelligent server 200 may convert the data related to the received speech input into text data. According to an embodiment, the intelligent server 200 may generate a plan for performing the task corresponding to the user speech input based on the text data.

According to an embodiment, the plan may be generated by an artificial intelligence (AI) system. The AI system may be a rule-based system or a neural network-based system (e.g., feedforward neural network (FNN)) or recurrent neutral network (RNN)). Or, the AI system may be a combination thereof or a system different therefrom. According to an embodiment, the plan may be selected from a set of pre-defined plans or created in real-time in response to a user request. For example, the AI system may select at least one plan from among a plurality of pre-defined plans.

According to an embodiment, the intelligent server 200 may transmit the result according to the generated plan to the user terminal 201 or transmit the generated plan to the user terminal 201. According to an embodiment, the user terminal 201 may display the result according to the plan on the display. According to an embodiment, the user terminal 201 may display the result of execution of the operation according to the plan on the display.

According to an embodiment, the intelligent server 200 may include a front end 210, a natural language platform 220, a capsule database (DB) 230, an execution engine 240, an end user interface 250, a management platform 260, a bigdata platform 270, or an analytic platform 280.

According to an embodiment, the front end 210 may receive the speech input from the user terminal 201. The front end 210 may receive a response corresponding to the speech input.

According to an embodiment, the natural language platform 220 may include an automatic speech recognition module (ASR module) 221, a natural language understanding module (NLU module) 223, a planner module 225, a natural language generator module (NLG module) 227, or a text to speech module (TTS module) 229.

According to an embodiment, the ASR module 221 may convert the user input received from the user terminal 201 into text data. According to an embodiment, the NLU module 223 may grasp the user's intent using the text data of the speech input. For example, the NLU module 223 may perform syntactic analysis or semantic analysis to grasp the user's intent. According to an embodiment, the NLU module 223 may grasp the meaning of a word extracted from the speech input using linguistic features (e.g., syntactic elements) of morphemes or phrases, match the grasped meaning of the word to the intent, and determine the user's intent.

According to an embodiment, the planner module 225 may generate a plan using the parameter and intent determined by the NLU module 223. According to an embodiment, the planner module 225 may determine a plurality of domains necessary to perform a task based on the determined intent. The planner module 225 may determine the plurality of operations included in the plurality of domains determined based on the intent. According to an embodiment, the planner module 225 may determine parameters necessary to execute the plurality of determined operations or resultant values output by execution of the plurality of operations. The parameters and resultant values may be defined in a designated format (or class) of concept. Thus, the plan may include the plurality of operations determined by the user's intent and a plurality of concepts. The planner module 225 may stepwise (or hierarchically) determine the relationship between the plurality of operations and the plurality of concepts. For example, the planner module 225 may determine the order of execution of the plurality of operations determined based on the user's intent based on the plurality of concepts. In other words, the planner module 225 may determine the order of execution of the plurality of operations based on the result output by execution of the plurality of operations and the parameters necessary to execute the plurality of operations. Thus, the planner module 225 may generate a plan that contains association information (e.g., ontology) between the plurality of operations and the plurality of concepts. A plan may be generated using information stored in the capsule DB 230 that stores a set of concept-operation relationships.

According to an embodiment, the NLG module 227 may convert designated information into a text type. The text-type information may be in the form of a natural language utterance. According to an embodiment, the TTS module 229 may convert text-type information into speech-type information.

According to an embodiment, all or some of the functions of the natural language platform 220 may also be implemented in the user terminal 201.

The capsule DB 230 may store information about the relationship between the plurality of concepts and operations corresponding to the plurality of domains. According to an embodiment, the capsule may include a plurality of concept objects (or concept information) and a plurality of action objects (or action information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry storing strategy information necessary to determine the plan corresponding to the speech input. The strategy information may include reference information for determining one plan if there are a plurality of plans corresponding to the speech input. According to an embodiment, the capsule DB 230 may include a follow up registry storing follow up information to propose a subsequent action to the user in a designated context. The subsequent action may include, e.g., a subsequent utterance. According to an embodiment, the capsule DB 230 may include a layout registry storing layout information about the information output via the user terminal 201. According to an embodiment, the capsule DB 230 may include a vocabulary registry storing vocabulary information included in capsule information. According to an embodiment, the capsule DB 230 may include a dialog registry storing dialog (or interaction) information with the user. The capsule DB 230 may update the stored object via a developer tool. The developer tool may include a function editor for updating, e.g., the action object or concept object. The developer tool may include a vocabulary editor for updating the vocabulary. The developer tool may include a strategy editor to generate and register a strategy to determine a plan. The developer tool may include a dialog editor to generate a dialog with the user. The developer tool may include a follow up editor capable of activating a subsequent goal and editing a subsequent utterance to provide a hint. The subsequent goal may be determined based on the current goal, the user's preference, or environmental conditions. According to an embodiment, the capsule DB 230 may also be implemented in the user terminal 201.

According to an embodiment, the execution engine 240 may produce a result using the generated plan. The end user interface 250 may transmit the produced result to the user terminal 201. Thus, the user terminal 201 may receive the result and provide the received result to the user. According to an embodiment, the management platform 260 may manage information used in the intelligent server 200. According to an embodiment, the bigdata platform 270 may gather user data. According to an embodiment, the analytic platform 280 may manage the quality of service (QoS) of the intelligent server 200. For example, the analytic platform 280 may manage the components and processing speed (or efficiency) of the intelligent server 200.

According to an embodiment, the service server 300 may provide a designated service (e.g., food ordering, hotel booking, CP service A 301, CP service B 302, or CP service C) to the user terminal 201. According to an embodiment, the service server 300 may be a server operated by a third party. According to an embodiment, the service server 300 may provide information for generating the plan corresponding to the received speech input to the intelligent server 200. The provided information may be stored in the capsule DB 230. The service server 300 may provide result information according to the plan to the intelligent server 200.

In the above-described integrated intelligence system, the user terminal 201 may provide various intelligent services to the user in response to user inputs. The user inputs may include, e.g., inputs using physical buttons, touch inputs, or speech inputs.

According to an embodiment, the user terminal 201 may provide a speech recognition service via an intelligence app (or speech recognition app) stored therein. In this case, for example, the user terminal 201 may recognize the user utterance or speech input received via the microphone and provide the service corresponding to the recognized speech input to the user.

According to an embodiment, the user terminal 201 may perform a designated operation, alone or together with the intelligent server and/or service server, based on the received speech input. For example, the user terminal 201 may execute the app corresponding to the received speech input and perform a designated operation via the executed app.

According to an embodiment, when the user terminal 201, together with the intelligent server 200 and/or service server, provides the service, the user terminal may detect a user utterance using the microphone (e.g., input module 150) and generate a signal (or speech data) corresponding to the detected user utterance. The user terminal may transmit the speech data to the intelligent server 200 via the communication module 190.

According to an embodiment, in response to the speech input received from the user terminal 201, the intelligent server 200 may generate a plan for performing the task corresponding to the speech input or the result of the operation performed according to the plan. The plan may include a plurality of actions for performing the task corresponding to the user's speech input and a plurality of concepts related to the plurality of actions. The concept may be one defining parameters input upon execution of the plurality of actions or one defining the resultant value output by execution of the plurality of actions. The plan may include association information between the plurality of actions and the plurality of concepts.

According to an embodiment, the user terminal 201 may receive the response via the communication module 190. The user terminal 201 may output the speech signal generated inside the user terminal 201 to the outside using the speaker (e.g., sound output module 155) or may output the image generated inside the user terminal 201 to the outside using the display module 160.

Figure 3:
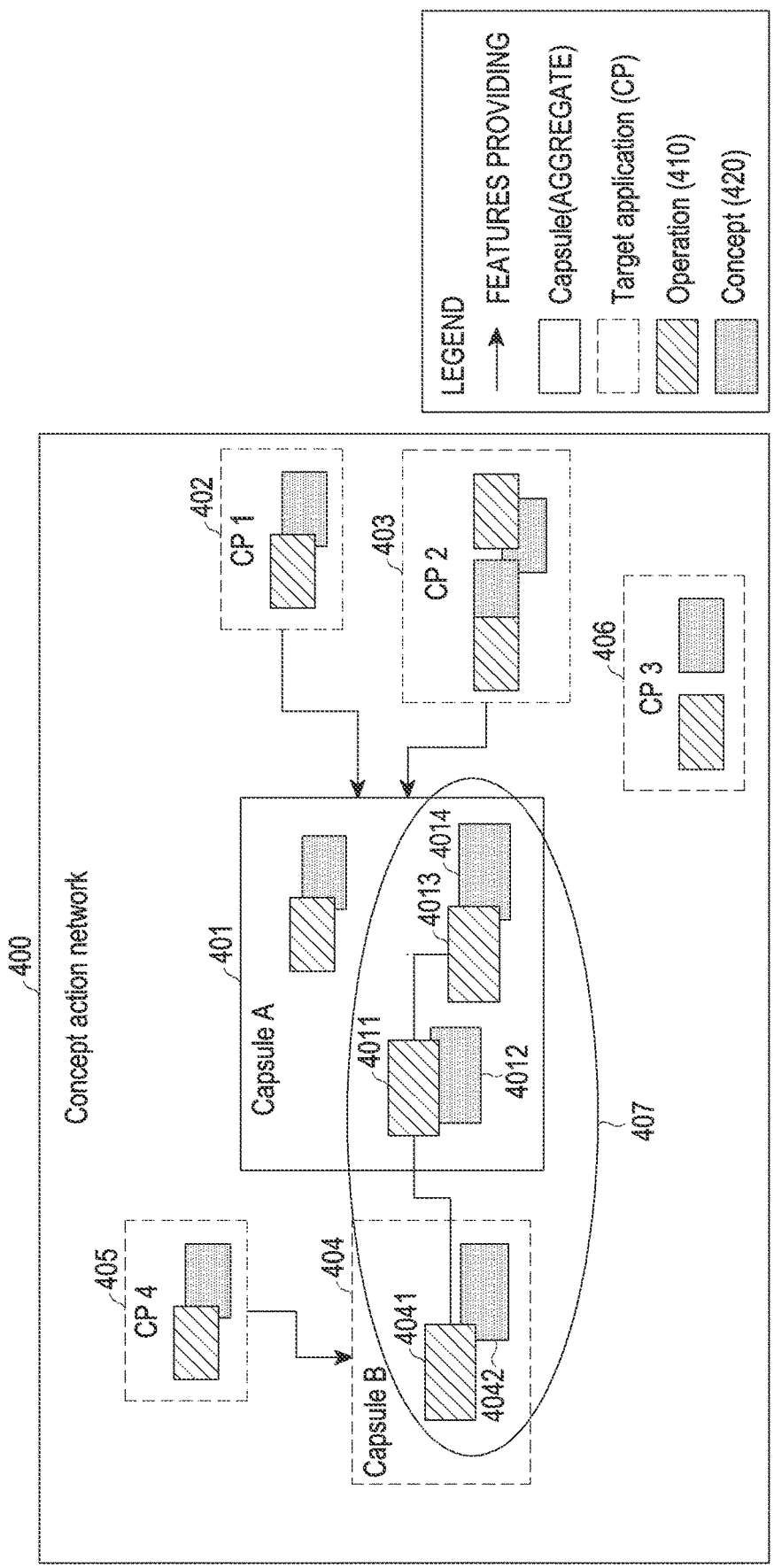
FIG. 3 is a view illustrating an example in which information for the relationship between concept and action is stored in a database according to an embodiment of the disclosure.

FIG. 3 is a view illustrating an example in which information for the relationship between concept and action is stored in a database according to an embodiment of the disclosure.

A capsule database (e.g., the capsule database 230) of the intelligent server 200 (e.g., the server 108 of FIG. 1) may store capsules in the form of a concept action network (CAN) 400. The capsule database may store an operation for processing a task corresponding to the user's speech input and a parameter necessary for the operation in the form of the CAN.

The capsule database according to an embodiment may store a plurality of capsules (capsule (A) 401 and capsule (B) 404) respectively corresponding to a plurality of domains (e.g., applications). According to an embodiment, one capsule (e.g., capsule (A) 401) may correspond to one domain (e.g., location (geo), application). Further, one capsule may correspond to at least one service provider (e.g., CP 1 402, CP 2 403, CP 3 406, or CP 4 405) for performing a function for a domain related to the capsule. According to an embodiment, one capsule may include at least one or more operations 410 and at least one or more concepts 420 for performing a designated function.

The natural language platform 220 may generate a plan for performing a task corresponding to the received speech input using a capsule stored in the capsule database. For example, the planner module 225 of the natural language platform may generate a plan using a capsule stored in the capsule database. For example, a plan 407 may be generated using operations 4011 and 4013 and concepts 4012 and 4014 of capsule A 401 and an operation 4041 and concept 4042 of capsule B 404.

Figure 4:
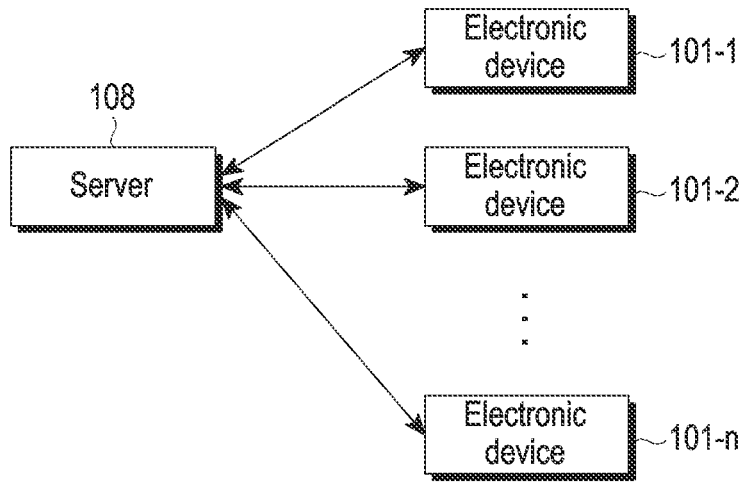
FIG. 4 is a view illustrating communication connections between a server and electronic devices according to an embodiment of the disclosure.

FIG. 4 is a view illustrating communication connections between a server and electronic devices according to an embodiment of the disclosure.

Referring to FIG. 4, a server 108 (e.g., a server 108 of FIG. 1 or an intelligent server 200 of FIG. 2) may communicate with a plurality of electronic devices 101-1, and 101-2 . . . 101-n) (e.g., an electronic device 101 of FIG. 1).

According to an embodiment, the plurality of electronic devices 101-1, and 101-2 . . . 101-n may be individually placed in different separated spaces (e.g., home, office, or school), or some of the plurality of electronic devices 101-1, and 101-2 . . . 101-n may be placed in the same space.

According to an embodiment, the respective users of the plurality of electronic devices 101-1, and 101-2 . . . 101-n may be different from each other, or the users of some of the plurality of electronic devices 101-1, and 101-2 . . . 101-n may be the same.

According to an embodiment, the server 108 may receive a user utterance from at least one of the plurality of electronic devices 101-1, and 101-2 . . . 101-n, and provide a response to the received user utterance to the at least one electronic device that has transmitted the user utterance.

Figure 5:
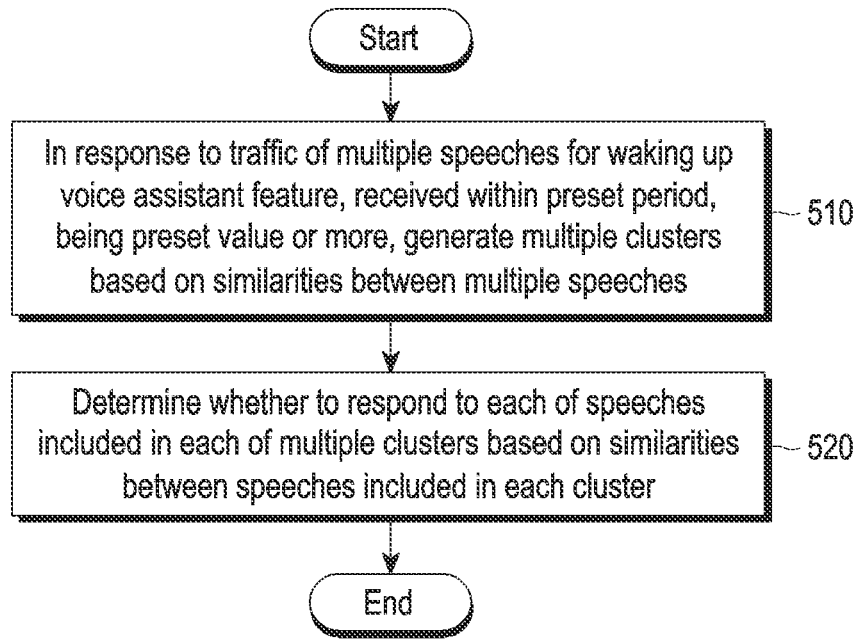
FIG. 5 is a view illustrating an operation for determining whether there is a false wakeup by a server according to an embodiment of the disclosure.

FIG. 5 is a view illustrating an operation for determining whether there is a false wakeup by a server according to an embodiment of the disclosure.

Referring to FIG. 5, in operation 510, a server (e.g., a server 108 of FIG. 1 or an intelligent server 200 of FIG. 2) may generate a plurality of clusters based on the similarities between a plurality of speeches if the traffic of the plurality of speeches for waking up the voice assistant feature, received through a communication module within a preset period, is a predetermined value or more.

For example, since it is rare for a plurality of users to simultaneously utter a speech for waking up the voice assistant feature, the server may identify whether the traffic of a plurality of speeches for waking up the voice assistant feature received within a predetermined time (e.g., simultaneously or within n seconds (ms) as preset) from the plurality of electronic devices (e.g., the electronic device 101 of FIG. 1 or the plurality of electronic devices 101-1, and 101-2 . . . 101-n of FIG. 4) through the communication module, is the predetermined value (e.g., the number of speeches is 100).

According to an embodiment, if it is identified that the traffic of the plurality of speeches received within the predetermined timed is less than the predetermined value, the server may transfer the plurality of speeches to an ASR module (e.g., the ASR module 221 of FIG. 2 or the ASR module of the normal response process 650 of FIG. 6) so as to provide a normal response to the plurality of speeches.

According to an embodiment, if it is identified that the traffic of the plurality of speeches received within the predetermined time is the predetermined value or more, the server may identify whether they are false wakeup speeches or sounds from external media, not user utterances.

For example, the server may generate a plurality of clusters based on the similarities between the plurality of speeches received within the predetermined time. According to an embodiment, each of the clusters may include two or more of the plurality of speeches, and the clusters may be classified based on ranges of similarities. According to an embodiment, an example form of a cluster is described below with reference to FIG. 9.

According to an embodiment, two or more speeches the similarities between which fall within a first range (e.g., 100%), among the plurality of speeches, may form one cluster, and the remaining speeches may form another cluster, in this case, the plurality of speeches may be classified into two clusters.

In another embodiment, two or more speeches the similarities between which fall within a second range (e.g., 80% or more and less than 100%), among the plurality of speeches, may form one cluster, and the remaining speeches may form another cluster, in this case, the plurality of speeches may be classified into two clusters.

In another embodiment, two or more speeches the similarities between which fall within a first range (e.g., 100%), among the plurality of speeches, may form one cluster, two or more other speeches the similarities between which fall within a second range (e.g., 80% or more and less than 100%), among the plurality of speeches, may form another cluster, and the remaining clusters may form another cluster. In this case, the plurality of speeches may be classified into three clusters.

In another embodiment, when the similarities between the plurality of speeches all fall within the first range or the second range, all of the plurality of speeches may form a single cluster.

According to an embodiment, the server may randomly sample an arbitrary number of speeches among the plurality of speeches and select them as a comparison group or may randomly compare the plurality of speeches and, if two speeches the similarity between which is a preset value or more are identified, select the identified two speeches as a comparison group.

According to an embodiment, the server may compare the speeches, selected as the comparison group, with the remaining speeches to thereby obtain similarities and classify the plurality of speeches based on the obtained similarities, thereby generating a plurality of clusters.

According to an embodiment, the server may identify the respective feature points of the plurality of speeches and compare the identified feature points to thereby obtain the similarities between the plurality of speeches. For example, the feature points may include the positions and distribution of the peaks that are obtained from the waveforms or spectra into which the speeches are transformed. As such, as similarities are determined merely with similarities without the need for language understanding, processing may be accelerated, and resource waste may be reduced. According to an embodiment, the feature points of speeches are described below with reference to FIG. 8.

According to an embodiment, the server may obtain similarities based on only portions of the plurality of speeches. For example, the server may obtain similarities based on the respective first portions of the plurality of speeches. As another embodiment, when at least one speech whose length is equal to or larger than a preset value is included in the plurality of speeches, the server may obtain similarities, only for the at least one speech, using some speeches. According to an embodiment, the server may identify the feature point of part of each speech and obtain similarities based on the feature point. As such, as similarities are determined merely with part of each speech, processing may be accelerated, and resource waste may be reduced.

According to an embodiment, the server may remove environmental features (e.g., the position of the microphone) of the electronic devices which have transmitted the plurality of speeches and then determine the similarities between the plurality of speeches.

The above-described clustering operation of the server is merely an example, and the server may perform clustering using other clustering techniques.

According to an embodiment, in operation 520, the server may determine whether to respond to each of the speeches included in each of the plurality of clusters based on the similarities between the speeches included in each of the clusters.

According to an embodiment, if the similarities between the plurality of speeches included in one cluster fall within a first range (e.g., 100%), the server may determine that all of the plurality of speeches included in the cluster are false wakeup speeches or sounds and determine to provide no response. For example, the server may terminate the response process without responding to the speech determined to be a false wakeup speech or sound.

According to an embodiment, the server may transmit a command for increasing a threshold for wakeup recognition to increase for a preset time without responding, to the terminal device which has provided the speech determined to be a false wakeup speech or sound. Thus, a speech for wakeup may be transferred to the server only when the speech for wakeup is clearly pronounced, so that repeated false wakeup may be prevented.

According to an embodiment, upon receiving again a false wakeup speech or sound from at least one terminal device among the plurality of terminal devices within a preset time during which the threshold for wakeup recognition has been increased, the server may transmit a command to extend the preset time to the at least one terminal device which has again transmitted the false wakeup speech or sound.

According to an embodiment, if it is identified that the plurality of speeches included in one cluster are false wakeup speeches or sounds, the server may store the feature points of the plurality of speeches identified as false wakeup speeches or sounds, as feature points of false wakeup speeches or sounds, in the memory. According to an embodiment, if the similarity between the feature point of a speech received regardless of traffic and the feature point of a false wakeup speech or sound stored is a preset value or more, the server may identify that the received speech is a false wakeup speech or sound. According to an embodiment, if it is identified that the traffic of a plurality of speeches received later within a preset time is a preset value or more, the server may identify whether the plurality of speeches are false wakeup speeches or sounds based on the feature points of the false wakeup speeches or sounds stored before comparison in similarity between the plurality of speeches.

According to an embodiment, if the similarities between the plurality of speeches included in one cluster fall within a second range (e.g., 80% or more and less than 100%), the server may determine to provide ambiguous responses to the plurality of speeches included in the cluster. For example, the ambiguous responses may include a response to identify whether to wake up or an utterance suitable for all situations.

According to an embodiment, the server may transmit ambiguous responses to a plurality of terminal devices individually corresponding to the plurality of speeches included in a cluster whose similarity falls within the second range.

According to an embodiment, if the similarities between the plurality of speeches included in one cluster fall within a third range (e.g., less than 80%) which is lower than the second range, the server may determine that all of the plurality of speeches included in the cluster are normal wakeups and perform a normal response process. For example, the server may transfer the plurality of speeches in the cluster to an ASR module (e.g., the ASR module 221 of FIG. 2 or the ASR module of the normal response process 650 of FIG. 6), thereby providing normal responses.

Similarity thresholds to divide the first, second, and third ranges for similarities are not limited to those described above, but may rather be varied according to embodiments.

Figure 6:
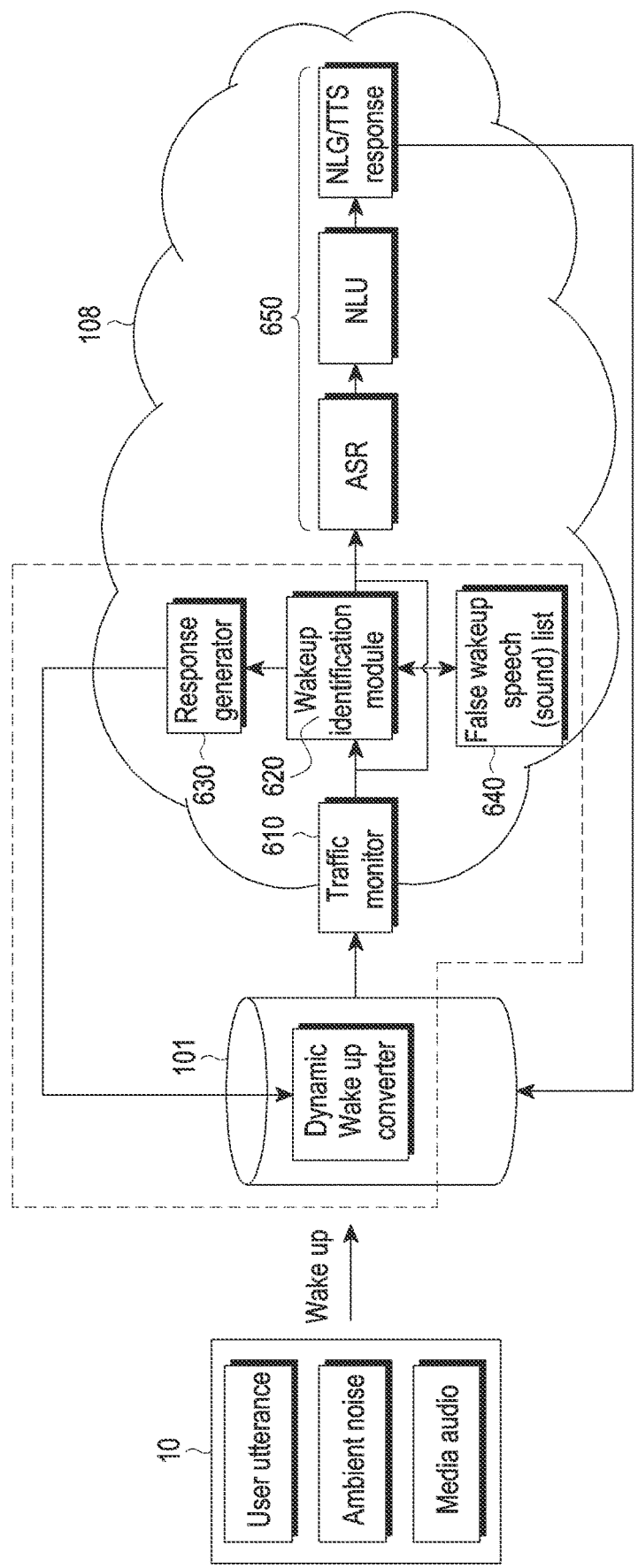
FIG. 6 is a view illustrating a system for determining whether there is a false wakeup according to an embodiment of the disclosure.

FIG. 6 is a view illustrating a system for determining whether there is a false wakeup according to an embodiment of the disclosure.

Referring to FIG. 6, an electronic device 101 (e.g., an electronic device 101 of FIG. 1 or a plurality of electronic devices 101-1, and 101-2 . . . 101-*n* of FIG. 4) may receive a trigger speech 10 to wake up the voice assistant feature. For example, the trigger speech 10 for wakeup may be a preset, specific keyword and may include at least one of a user utterance, ambient noise, or media audio and may be a wakeup trigger speech intended by the user or a false wakeup speech erroneously recognized.

According to an embodiment, upon receiving the trigger speech 10 to wake up the voice assistant feature, the electronic device 101 may transmit the trigger speech 10 to a server 108 (e.g., the server 108 of FIG. 1, the intelligent server 200 of FIG. 2, or the server 108 of FIG. 4).

According to an embodiment, the server 108 may identify the traffic of a plurality of speeches received within a preset time (e.g., simultaneously or n seconds (ms)) through a traffic monitor module 610. For example, the plurality of speeches may be individually received by different electronic devices. According to an embodiment, the traffic monitor module 610 may be included in a front end (e.g., the front end 210 of FIG. 2) of the server 108.

According to an embodiment, if the traffic of the plurality of speeches received within the preset time is identified to be less than a preset value through the traffic monitor module 610, the server 108 may identify it as providing a normal response and transfer the plurality of speeches to the ASR module to perform a normal response process 650. According to an embodiment, the normal response process 650 may include an ASR module (e.g., the ASR module 221 of FIG. 2) and an NLU module (e.g., the NLU module 223 of FIG. 2) and, although not illustrated in FIG. 6, may further include an NLG module (e.g., the NLG module 227 of FIG. 2) and a TTS module (e.g., the TTS module 229 of FIG. 2).

According to an embodiment, if the traffic of the plurality of speeches received within the preset time is identified to be the preset value or more through the traffic monitor module 610, the server 108 may identify whether the plurality of speeches received within the preset time are false wakeup speeches or sounds through a wakeup identification module 620.

According to an embodiment, the server 108 may generate a plurality of clusters based on the similarities between the plurality of speeches received within the preset time through the wakeup identification module 620 and determine whether to respond depending on the range of the similarities between the plurality of speeches included in one cluster.

According to an embodiment, if the similarities between the plurality of speeches included in one cluster fall within a first range (e.g., 100%), the server 108 may identify that the plurality of speeches are completely identical and are false wakeup speeches or sounds from ambient noise or media audio, through the wakeup identification module 620.

According to an embodiment, if the similarities between the plurality of speeches included in one cluster falls within a second range (e.g., 80% or more and less than 100%), the server 108 may determine to provide ambiguous responses through the wakeup identification module 620. The similarities between the plurality of speeches may fall within the second range when the user utterance for wakeup, along with ambient noise or media audio, is received, thus, the server 108 may determine to provide an ambiguous response to identify whether to wake up.

According to an embodiment, if the similarities between the plurality of speeches included in one cluster fall within a third range (e.g., less than 80%), the server 108 may determine to perform a normal response process 650, through the wakeup identification module 620. Upon performing the normal response process 650, the server 108 may determine to provide a response corresponding to the output from the NLU module.

According to an embodiment, the server 108 may transfer a result of identification obtained by the wakeup identification module 620 to a response generator 630.

According to an embodiment, if the plurality of speeches included in one cluster are identified as false wakeup speeches or sounds, the server 108 may store the feature points of the plurality of speeches, identified as false wakeup speeches or sounds, in a false wakeup speech or sound list 640.

According to an embodiment, when the plurality of speeches included in one cluster are identified as false wakeup speeches or sounds, the response generator 630 may terminate the response process without responding to the electronic device 101 which has transmitted the speech.

According to an embodiment, when the speech is a false wakeup speech or sound, the server 108 may transmit a command to increase the threshold for wakeup to a dynamic wakeup converter module of the electronic device 101.

For example, if it is set as default that wakeup succeeds when the similarity between the keyword for wakeup and the trigger speech is 7 (when a perfect match is assumed to be 10), the electronic device 101 may increase the threshold for successful wakeup to 8 for a predetermined time (e.g., one minute) based on the command received from the server 108.

According to an embodiment, the server 108 may determine how much the threshold is to be increased based on the size of the cluster. For example, if the number of speeches identified as false wakeup speeches or sounds is a preset value, the server 108 may further increase the threshold. For example, if the size of the cluster including the speeches identified as false wakeup speeches or sounds is a preset value or more, the server 108 may transmit, to the electronic device 101, a command to increase the threshold to 9.

According to an embodiment, if a false wakeup speech or sound is again input from the electronic device 101 during the time for which the threshold for wakeup has been increased, the server 108 may transmit a command for extending the time to increase the threshold to the dynamic wakeup converter module of the electronic device 101.

For example, the electronic device 101 may extend the time to increase the threshold for successful wakeup from one minute to five minutes based on the extend command received from the server 108. According to an embodiment, if false wakeup speeches or sounds are repeated, the time to increase the threshold may be stepwise extended to, e.g., 10 minutes and 30 minutes.

According to an embodiment, if it is determined to provide normal responses or ambiguous responses to the plurality of speeches included in one cluster, the response generator 630 may generate corresponding responses and provide the responses to the electronic device 101. According to an embodiment, the operation of the response generator 630 is described below in connection with FIG. 10.

Figure 7:
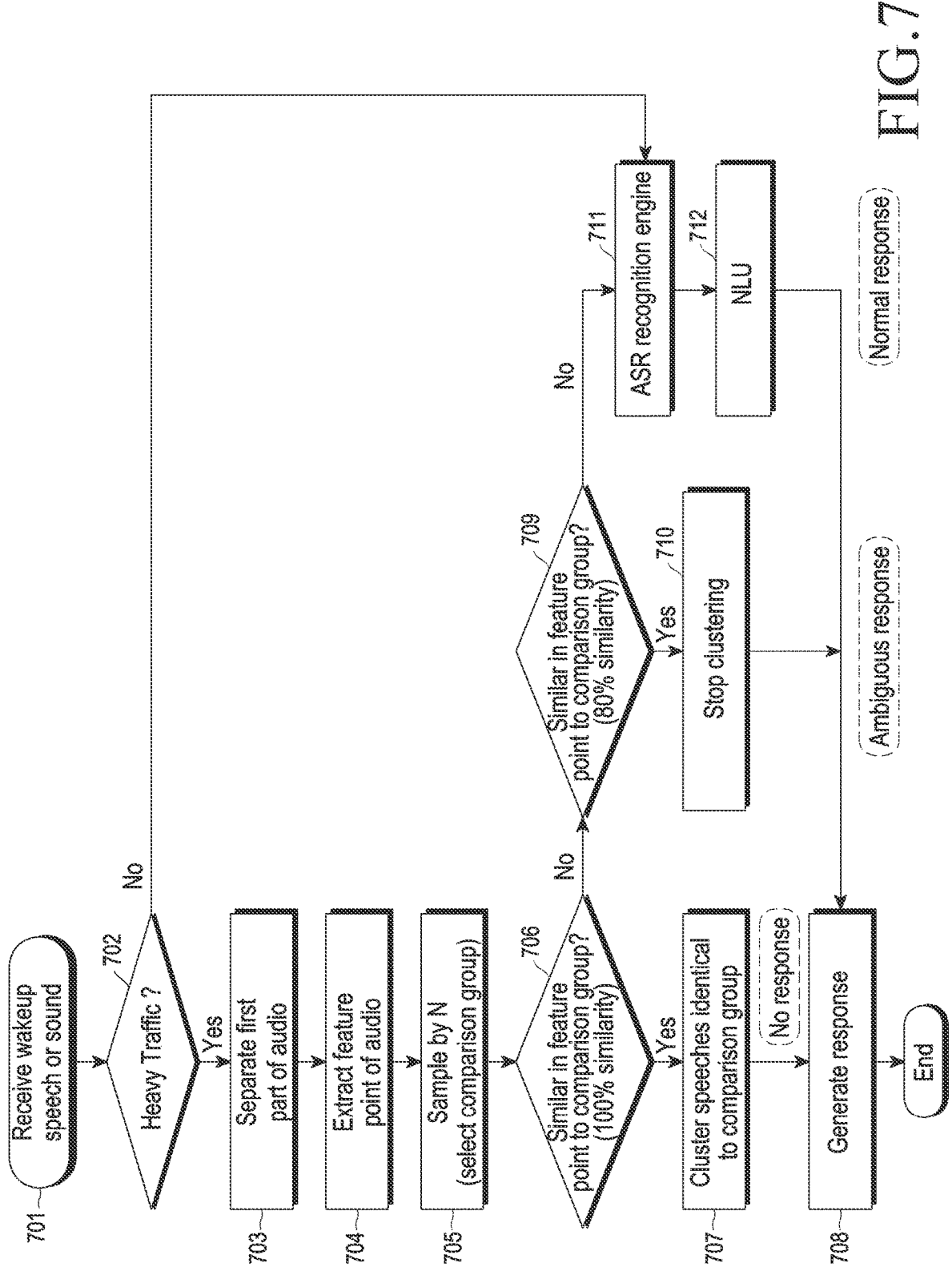
FIG. 7 is a view illustrating a server's response process depending on whether there is a false wakeup according to an embodiment of the disclosure.

FIG. 7 is a view illustrating a server's response process depending on whether there is a false wakeup according to an embodiment of the disclosure.

Referring to FIG. 7, in operation 701, a server (e.g., a server 108 of FIG. 1 or an intelligent server 200 of FIG. 2) may receive a wakeup. For example, the server may receive wakeup speeches received by a plurality of electronic devices (e.g., the electronic device 101 of FIG. 1 or the user terminal 201 of FIG. 2) from the plurality of electronic devices.

According to an embodiment, in operation 702, the server may identify whether traffic is larger than or equal to a set value. For example, the server may determine whether a preset number (e.g., 100) of, or more, speeches are received within a preset time (e.g., simultaneously or n seconds (ms)).

According to an embodiment, if the traffic is the preset value or more (yes in operation 702), the server may separate the respective first parts of the plurality of speeches in operation 703. According to an embodiment, if the lengths of the speeches are shorter than a preset length, operation 703 may be omitted.

According to an embodiment, in operation 704, the server may extract feature points from each of the plurality of speeches. For example, the server may decompose the speeches into waveforms and spectra and extract feature points in real-time. The feature points extracted from the speeches are described below with reference to FIG. 8. According to an embodiment, the extraction of feature points may be performed by a feature point extraction technique. According to an embodiment, the server may visualize the speeches as spectrograms to thereby identify feature points.

According to an embodiment, in operation 705, the server may randomly sample N speeches among the plurality of speeches and select them as a comparison group. According to an embodiment, the server may randomly compare the plurality of speeches and, if two speeches the similarity between which is a preset value or more are identified, select the identified two speeches as a comparison group.

According to an embodiment, in operation 706, the server may determine whether the feature point of the comparison group matches the feature point of each of the plurality of speeches within a first range of similarities. For example, the server may determine whether the feature point of the comparison group matches the feature point of each of the plurality of speeches by a similarity of 100%.

According to an embodiment, if the feature point of the comparison group matches, by a similarity of 100%, the feature point of a specific speech among the plurality of speeches (yes in operation 706), the server may cluster the identified speech as the same speech as the comparison group in operation 707. For example, the server may determine that the 100% matching speech is a false wakeup speech or sound from media, not a user utterance, and determine to provide no response.

According to an embodiment, in operation 708, the server may generate a response based on a result of providing no response.

According to an embodiment, if the feature point of the comparison group does not match, by a similarity of 100%, the feature point of a specific speech among the plurality of speeches (no in operation 706), the server may determine whether the feature point of the comparison group is similar to the feature point of the specific speech in operation 709. For example, the server may determine whether the feature point of the comparison group matches the feature point of the specific speech by a similarity of 80% or more.

According to an embodiment, if the feature point of the comparison group matches the feature point of the specific speech by a similarity of 80% or more (yes in operation 709), the server may stop clustering on the specific speech and determine to provide an ambiguous response to the specific speech in operation 710.

According to an embodiment, in operation 708, the server may generate a response based on a result of providing an ambiguous response.

According to an embodiment, if the feature point of the comparison group matches the feature point of the specific speech by a similarity of less than 80% (no in operation 709), the server may perform automatic speech recognition (ASR) on the specific speech in operation 711. According to an embodiment, in operation 712, the server may perform natural language understanding (NLU) using a result of ASR. For example, if the similarity in feature point between the comparison group and the specific speech is low, the server may determine to provide a normal response based on a result of NLU, for the specific speech.

According to an embodiment, in operation 708, the server may generate a normal response based on the result of NLU. For example, the server may perform natural language generation (NLG) and text-to-speech (TTS) based on the result of NLU, thereby generating a normal response.

According to an embodiment, the operation of generating a response by the server based on the similarity between speeches is described below with reference to FIG. 10.

According to an embodiment, if the traffic is less than the preset value (no in operation 702), the server may perform ASR and NLU on the received wakeup speech in operations 711 and 712. For example, if the traffic is less than the preset value, the server may identify it as providing a normal response to the received wakeup speech and perform NLG and TTS based on the result of ASR and NLU on the received wakeup speech to thereby generate a normal response in operation 708.

Figure 8:
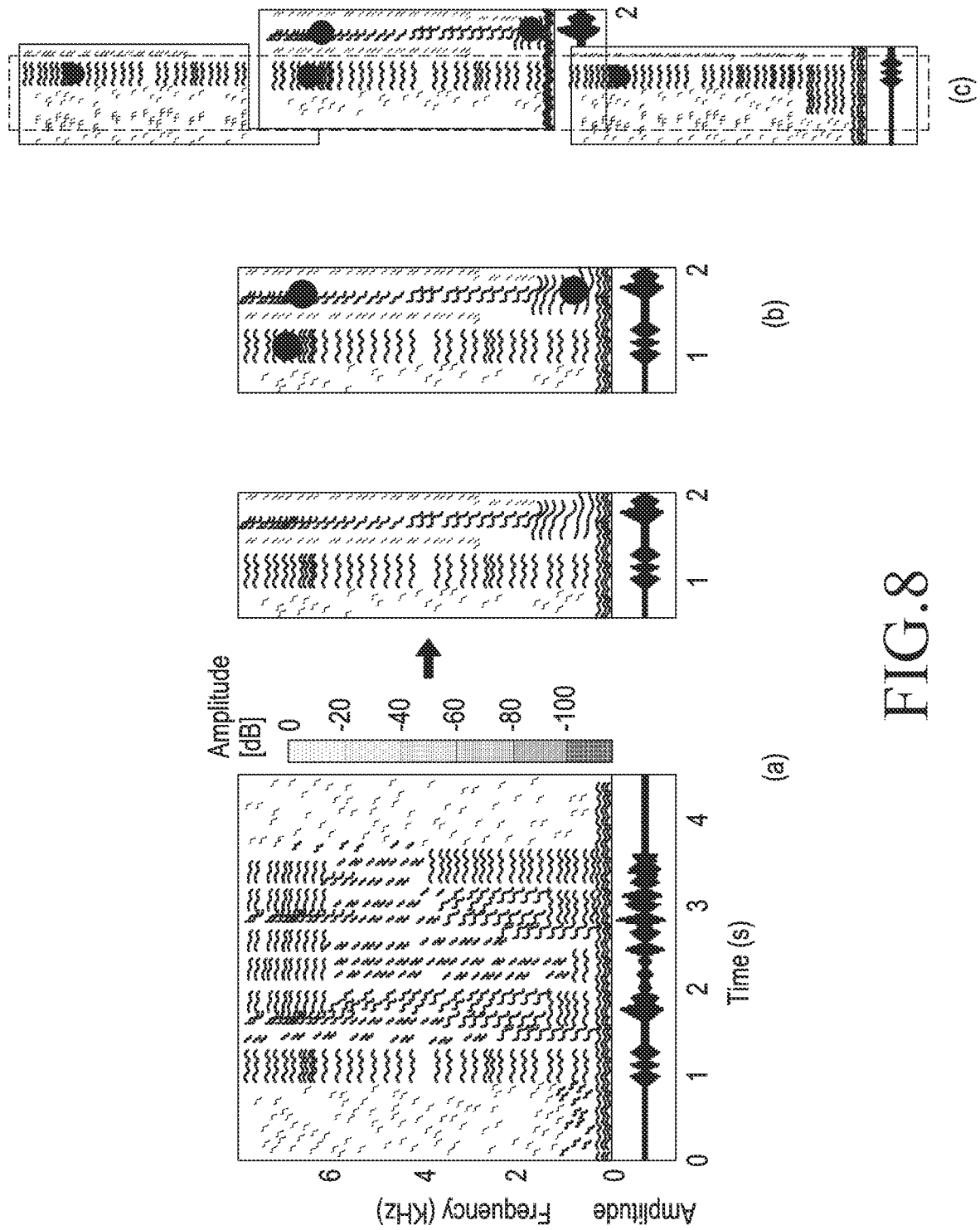
FIG. 8 is a view illustrating an operation for obtaining similarities between a plurality of speeches according to an embodiment of the disclosure.

FIG. 8 is a view illustrating an operation for obtaining similarities between a plurality of speeches according to an embodiment of the disclosure.

Referring to (a) of FIG. 8, a server (e.g., a server 108 of FIG. 1 or an intelligent server 200 of FIG. 2) may represent a plurality of received speeches as waveforms and spectra.

According to an embodiment, since the volume of the plurality of speeches may be varied depending on the position of the microphone or ambient environmental factors, the server may perform normalization.

According to an embodiment, the server may separate only first parts of speeches whose lengths are a preset value or more among the plurality of speeches.

Referring to (b) of FIG. 8, the server may identify the part in a specific color or at least one pitch, as a feature point, in the visual representation of the speeches. For example, the positions or distribution of feature points may be treated as voiceprint data.

Referring to (c) of FIG. 8, the server may match the time frames based on the feature point of each of the plurality of speeches and then determine the similarities between the plurality of speeches and score them.

Figure 9:
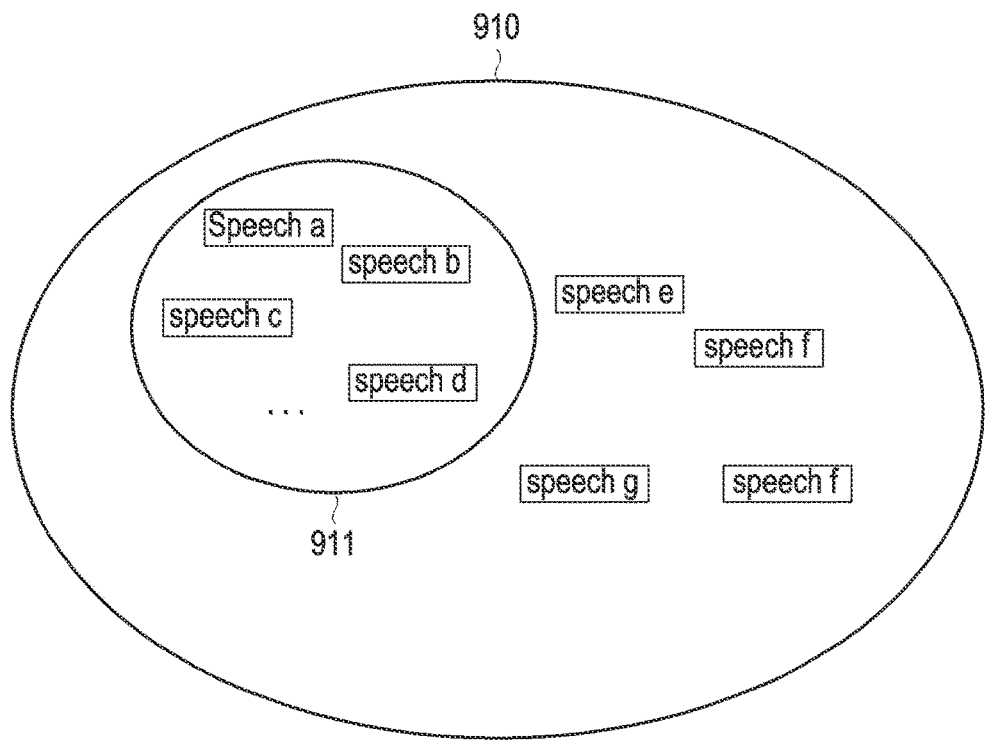
FIG. 9 is a view illustrating a clustering operation by a server according to an embodiment of the disclosure.

FIG. 9 is a view illustrating a clustering operation by a server according to an embodiment of the disclosure.

Referring to FIG. 9, a server may generate a cluster 911 from a plurality of speeches 910, based on similarities. According to an embodiment, a plurality of speeches which are not included in the cluster 911 may be regarded as one cluster of low-similarity speeches.

According to an embodiment, the cluster 911 may be one generated to include a plurality of speeches the similarities between which fall within a first range or one generated to include a plurality of speeches the similarities between which fall within a second range.

Although FIG. 9 illustrates only one cluster 911 for ease of description, a plurality of clusters may be generated based on different similarities between the plurality of speeches 910 or, if the plurality of speeches 910 all are identical, all of the plurality of speeches may be grouped into one cluster.

Figure 10:
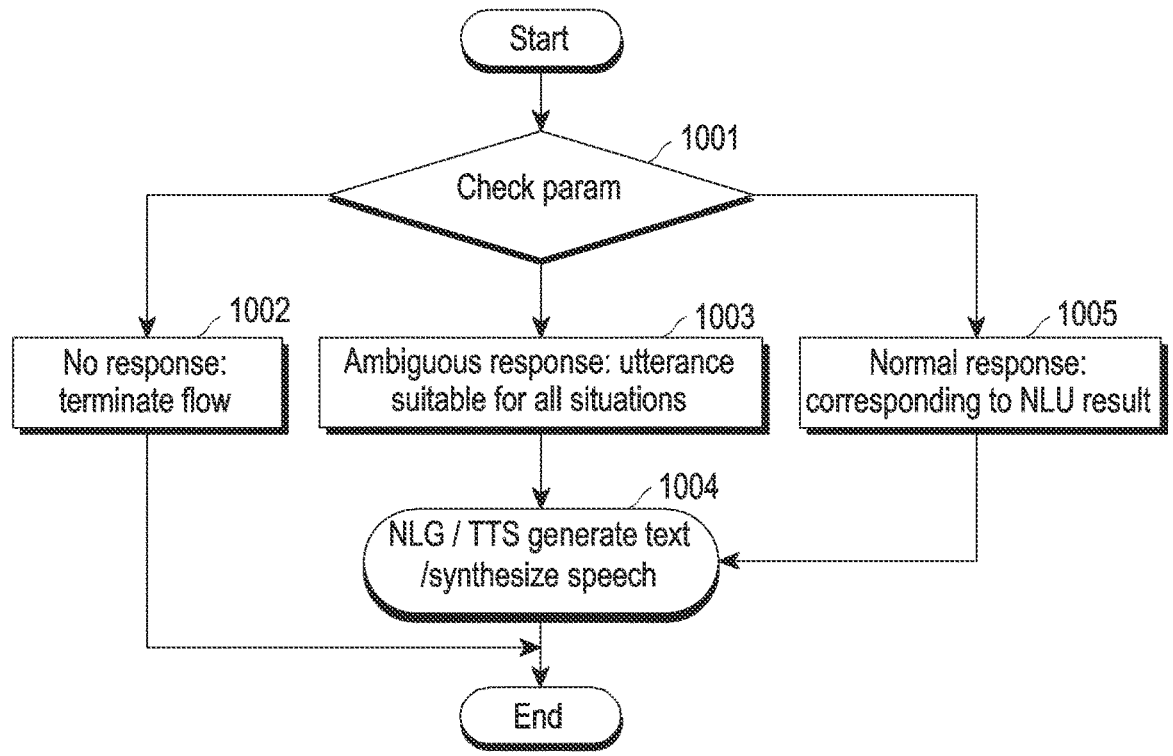
FIG. 10 is a view illustrating an operation for generating a response in a server's response process according to an embodiment of the disclosure.

FIG. 10 is a view illustrating an operation for generating a response in a server's response process according to an embodiment of the disclosure.

For example, a server (e.g., a server 108 of FIG. 1, an intelligent server 200 of FIG. 2, a server 108 of FIG. 6, or a response generator 630 of FIG. 6) may generate different responses depending on similarities between the plurality of speeches in the cluster.

Referring to FIG. 10, in operation 1001, a server may check a parameter. For example, the parameter may be one that is obtained by the server (e.g., the wakeup identification module 620 of FIG. 6) based on the similarities between the plurality of speeches.

According to an embodiment, in operation 1002, if the parameter is determined to be a non-response parameter, the server may terminate the process (or flow) without responding to the speeches. For example, the non-response parameter may be a parameter when the wakeup speech is a false wakeup speech or sound.

According to an embodiment, if the parameter is determined to be a parameter for providing an ambiguous response in operation 1003, the server may perform an NLG operation for generating an ambiguous response text and a TTS operation for synthesizing an ambiguous response speech in operation 1004. For example, the ambiguous response may mean an utterance suitable for any situation including when a wakeup occurs as intended and when a false wakeup occurs and may include an utterance for checking wakeup, such as "Did you call me?" or "Huh? Did you hear something?".

According to an embodiment, if the parameter is determined to be a parameter for providing a normal response in operation 1005, the server may perform an NLG operation for generating a response text corresponding to the result of NLU and a TTS operation for synthesizing an ambiguous response speech in operation 1004.

Figure 11:
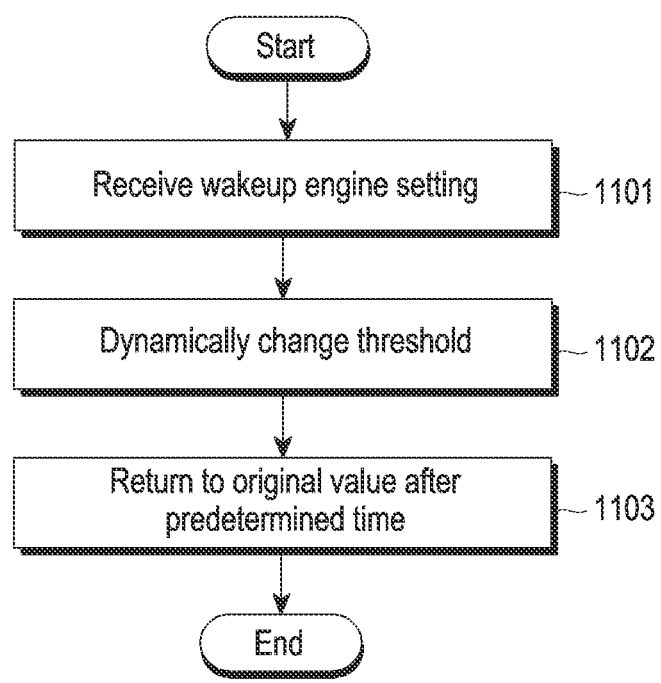
FIG. 11 is a view illustrating an operation of an electronic device upon a false wakeup according to an embodiment of the disclosure.

FIG. 11 is a view illustrating an operation of an electronic device upon a false wakeup according to an embodiment of the disclosure.

For example, if the plurality of speeches included in one cluster are identified as false wakeup speeches or sounds, a plurality of electronic devices may have individually transmitted the plurality of speeches to the server.

Referring to FIG. 11, an electronic device (e.g., an electronic device 101 of FIG. 1, a processor 120 of FIG. 1, a user terminal 201 of FIG. 2, or an electronic device 101 of FIG. 6) may receive a wakeup engine setting in operation 1101. For example, the electronic device may receive, from a server (e.g., a server 108 of FIG. 1, an intelligent server 200 of FIG. 2, or a server 108 of FIG. 6), a wakeup engine setting including a command to increase a wakeup threshold according to a false wakeup speech or sound. For example, the wakeup engine setting may include a threshold for recognizing successful wakeup and information for a time to increase the threshold.

According to an embodiment, in operation 1102, the electronic device may dynamically change the threshold for wakeup. For example, the electronic device may increase the threshold for recognizing successful wakeup during the time to increase the threshold, included in the wakeup engine setting.

For example, if the perfect match between the keyword for wakeup and the received speech is 10, and the threshold for successful wakeup is 7, the electronic device may increase the threshold to 8 during the preset time. Thus, the wakeup recognition sensitivity may reduce and, only when the keyword is clearly uttered, wakeup may succeed, thus, false wakeup may decrease.

According to an embodiment, in operation 1103, the electronic device may return the threshold to its original value after a predetermined time. For example, a preset time after the threshold has been increased, the electronic device may change the threshold back to the original value.

According to an embodiment, if a false wakeup speech or sound is received before the preset time elapses and after the threshold has been increased, the electronic device may receive, from the server, a command to extend the time to increase the threshold and extend the time to increase the threshold, based on the received command.

Figure 12:
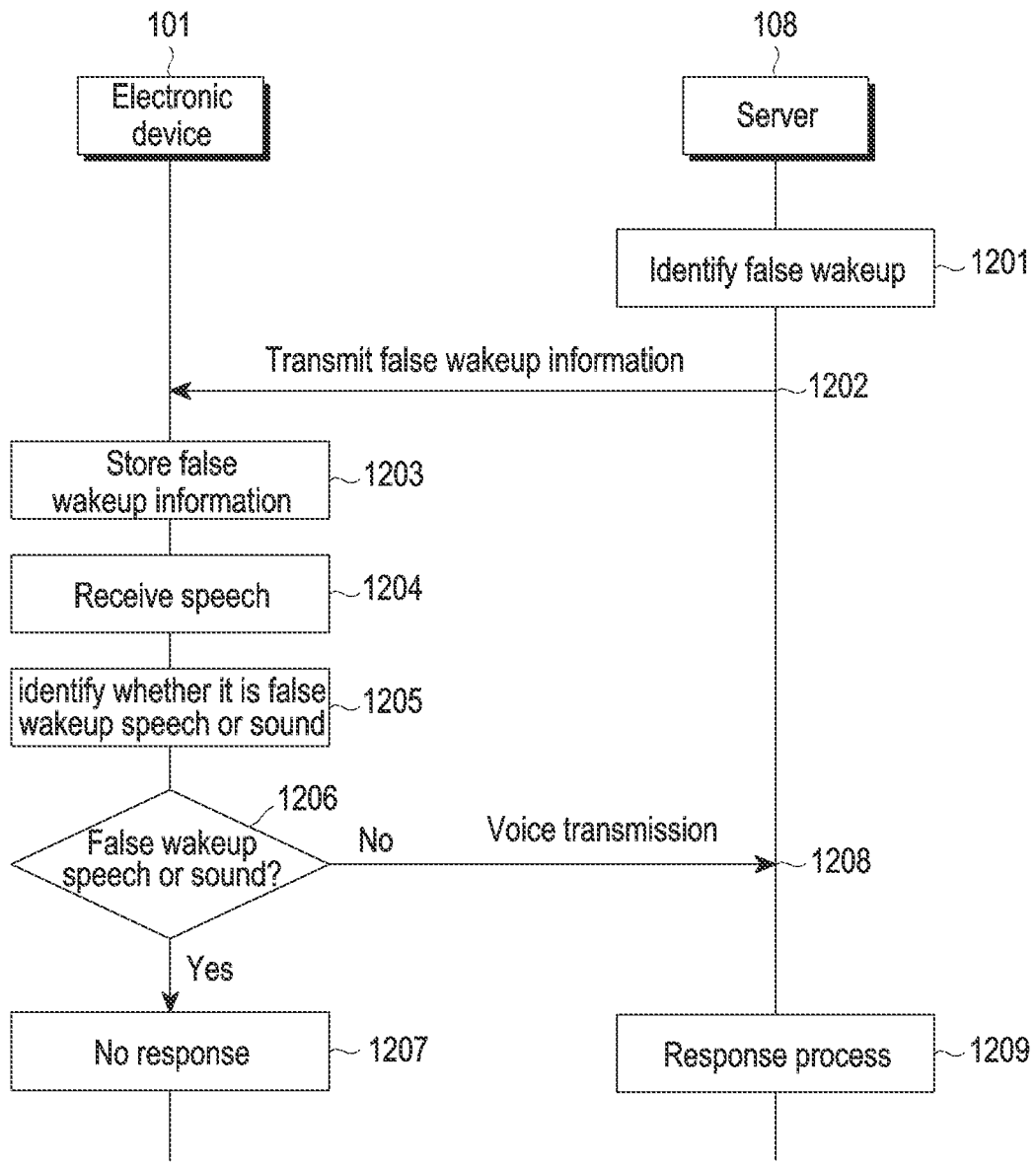
FIG. 12 is a view illustrating an operation for identifying a false wakeup by an electronic device according to an embodiment of the disclosure.

FIG. 12 is a view illustrating an operation for identifying a false wakeup by an electronic device according to an embodiment of the disclosure.

Referring to FIG. 12, in operation 1201, a server 108 (e.g., a server 108 of FIG. 1 or an intelligent server 200 of FIG. 2) may identify a false wakeup. According to an embodiment, the operation of identifying false wakeup is substantially the same as the operations described above in connection with FIGS. 5 to 10, and no duplicate description thereof is given.

According to an embodiment, in operation 1202, the server 108 transmits false wakeup speech or sound information to an electronic device 101 (e.g., the electronic device 101 of FIG. 1, the user terminal 201 of FIG. 2, or the electronic device 101 of FIG. 6). For example, the server 108 may transmit false wakeup speech or sound information including the feature point of the speech identified as false wakeup speech or sound to the electronic device 101.

According to an embodiment, in operation 1203, the electronic device 101 may store the false wakeup speech or sound information received from the server 108 in a memory (e.g., the memory 130 of FIG. 1).

According to an embodiment, in operation 1204, the electronic device 101 may receive a speech. For example, the electronic device 101 may receive a trigger speech for waking up the voice assistant feature.

According to an embodiment, in operation 1205, the electronic device 101 may identify whether the received speech is a false wakeup speech or sound. For example, the electronic device 101 may identify whether the received speech is a false wakeup speech or sound based on the stored false wakeup speech or sound information. For example, the electronic device 101 may identify whether the received speech is a false wakeup speech or sound based on the similarity between the feature point of the stored false wakeup speech or sound and the feature point of the received speech.

According to an embodiment, if it is identified that the received speech is a false wakeup speech or sound (yes in operation 1206), the electronic device 101 may provide no response in operation 1207. For example, the electronic device 101 may provide no response to the received speech and terminate the response process for the received speech.

According to an embodiment, if it is identified that the received speech is not a false wakeup speech or sound (no in operation 1206), the electronic device 101 may transmit the received speech to the server 108 in operation 1208.

According to an embodiment, in operation 1209, the server 108 may perform a response process on the speech received from the electronic device 101. For example, the server 108 may transfer the received speech to a speech recognition module (e.g., the ASR module 221 of FIG. 2 or the normal response process 650 of FIG. 6) to perform a response process on the speech received from the electronic device 101. According to an embodiment, the response process may further include an NLU module (e.g., the NLU module 223 of FIG. 2), an NLG module (e.g., the NLG module 227 of FIG. 2), and a TTS module (e.g., the TTS module 229 of FIG. 2).

As such, the electronic device 101 may store the false wakeup speech or sound information, identify whether the received speech is a false wakeup speech or sound based on the stored false wakeup speech or sound information before transmitting the received speech to the server 108 and, if the received speech is identified as a false wakeup speech or sound, terminate the response process on the received speech, thereby reducing erroneous wakeup and waste of resources used for the response process due to false wakeup.

FIG. 13 is a view illustrating a situation in which a response is provided upon a false wakeup according to an embodiment of the disclosure.

According to an embodiment, an electronic device 101 (e.g., the electronic device 101 of FIG. 1, the user terminal 201 of FIG. 2, or the electronic device 101 of FIG. 6) may provide no response if a received speech for wakeup is identified as a false wakeup speech or sound by a server (e.g., the server 108 of FIG. 1, the intelligent server 200 of FIG. 2, or the server 108 of FIG. 6).

Referring to (a) of FIG. 13, even when an electronic device 101 misrecognizes a TV sound as a wakeup speech intended by the user, the electronic device 101 may terminate the process without responding to the reception of the wakeup speech by the server's false wakeup identification. In another embodiment, if the electronic device 101 stores false wakeup speech information, the electronic device 101 may compare a received wakeup speech with the stored false wakeup speech information and, if the received wakeup speech is identified as a false wakeup speech or sound, terminate the process without responding to the received wakeup speech.

As another embodiment, if it is ambiguous whether a speech for wakeup is a wakeup intended by the user or a false wakeup speech or sound, the electronic device 101 may provide an ambiguous response by the server, thereby identifying whether to wake up.

Referring to (b) of FIG. 13, if the electronic device 101 recognizes reception of a wakeup speech, but the server is not sure whether the wakeup speech is one from a TV sound or the user's intended utterance, the server may output, through the electronic device 101, an ambiguous response, e.g., "Did you call me?" without performing ASR on the received speech, thereby inducing the user's utterance and identifying whether to wake up.

According to an embodiment, a server (e.g., the server 108 of FIG. 1) comprises a communication module, and at least one processor operatively connected with the communication module, and the at least one processor may be configured to, if traffic of a plurality of speeches to wake up a voice assistant feature, received within a preset period is a preset value or more, generate a plurality of clusters based on similarities between the plurality of speeches, and determine whether to respond to each of speeches included in each of the plurality of clusters based on similarities between the speeches included in each of the plurality of clusters.

According to an embodiment, the at least one processor may be configured to identify respective feature points of the plurality of speeches and generate the plurality of clusters based on similarities between the respective feature points of the plurality of speeches.

According to an embodiment, the at least one processor may be configured to, if at least one speech whose length is a preset value or more is included in the plurality of speeches, obtain respective parts of the at least one speech, and generate the plurality of clusters based on similarities between the respective parts of the at least one speech, for the at least one speech.

According to an embodiment, the at least one processor may be configured to, if similarities between a plurality of speeches included in a first cluster among the plurality of clusters falls within a first range not less than a preset value, determine the plurality of speeches included in the first cluster as false wakeup speeches or sounds, and terminate a process without responding to the plurality of speeches included in the first cluster.

According to an embodiment, the at least one processor may be configured to transmit a command to increase a threshold for wakeup recognition during a preset time to a plurality of terminal devices individually corresponding to the plurality of speeches included in the first cluster.

According to an embodiment, the at least one processor may be configured to, upon receiving a false wakeup speech or sound from at least one terminal device among the plurality of terminal devices within the preset time, transmit a command to extend the preset time to the at least one terminal device.

According to an embodiment, the at least one processor may be configured to transmit response data for identifying whether to wake up to a plurality of terminal devices individually corresponding to the plurality of speeches included in the first cluster if the similarities between the plurality of speeches included in the first cluster fall within a second range lower than the first range.

According to an embodiment, the at least one processor may be configured to transfer the plurality of speeches to an automatic speech recognition (ASR) module if the similarities between the plurality of speeches included in the first cluster fall within a third range lower than the second range.

According to an embodiment, the server may further comprise a memory, and the at least one processor may be configured to store feature points for the plurality of speeches included in the first cluster, as feature points of false wakeup speeches or sounds, in the memory.

According to an embodiment, the at least one processor may be configured to transfer the plurality of speeches for waking up the voice assistant feature to an automatic speech recognition (ASR) module if the traffic is less than the preset value.

According to an embodiment, a method for controlling a server comprises, if traffic of a plurality of speeches to wake up a voice assistant feature, received within a preset period is a preset value or more, generating a plurality of clusters based on similarities between the plurality of speeches, and determining whether to respond to each of speeches included in each of the plurality of clusters based on similarities between the speeches included in each of the plurality of clusters.

According to an embodiment, generating the plurality of clusters may include identifying respective feature points of the plurality of speeches and generating the plurality of clusters based on similarities between the respective feature points of the plurality of speeches.

According to an embodiment, generating the plurality of clusters may include, if at least one speech whose length is a preset value or more is included in the plurality of speeches, obtaining respective parts of the at least one speech, and generating the plurality of clusters based on similarities between the respective parts of the at least one speech, for the at least one speech.

According to an embodiment, determining whether to respond may include, if similarities between a plurality of speeches included in a first cluster among the plurality of clusters falls within a first range not less than a preset value, determining the plurality of speeches included in the first cluster as false wakeup speeches or sounds, and terminating a process without responding to the plurality of speeches included in the first cluster.

According to an embodiment, the method may further comprise transmitting a command to increase a threshold for wakeup recognition during a preset time to a plurality of terminal devices individually corresponding to the plurality of speeches included in the first cluster.

According to an embodiment, the method may further comprise, upon receiving a false wakeup speech or sound from at least one terminal device among the plurality of terminal devices within the preset time, transmitting a command to extend the preset time to the at least one terminal device.

According to an embodiment, determining whether to respond may include transmitting response data for identifying whether to wake up to a plurality of terminal devices individually corresponding to the plurality of speeches included in the first cluster if the similarities between the plurality of speeches included in the first cluster fall within a second range lower than the first range.

According to an embodiment, determining whether to respond may include transferring the plurality of speeches to an automatic speech recognition (ASR) module if the similarities between the plurality of speeches included in the first cluster fall within a third range lower than the second range.

According to an embodiment, the method may further comprise storing feature points of the plurality of speeches included in the first cluster, as feature points of false wakeup speeches or sounds.

According to an embodiment, the method may further comprise transferring the plurality of speeches for waking up the voice assistant feature to an automatic speech recognition (ASR) module if the traffic is less than the preset value.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A server comprising:
a communication circuitry;
one or more processors operatively connected with the communication circuitry; and
memory storing one or more computer programs including computer-executable instructions that, when executed by the one or more processors, cause the server to:
in response to traffic of a plurality of speeches to wake up a voice assistant feature, received within a preset period being a preset value or more, generate a plurality of clusters based on similarities between the plurality of speeches, and
determine whether to respond to each of speeches included in each of the plurality of clusters based on similarities between the speeches included in each of the plurality of clusters,
wherein the one or more computer programs further comprise computer-executable instructions that, when executed by the one or more processors, cause the server to, as at least part of determining whether to respond:
in response to similarities between a plurality of speeches included in a first cluster among the plurality of clusters falling within a first range not less than a preset value, determine the plurality of speeches included in the first cluster as false wakeup speeches or sounds, and
terminate a process without responding to the plurality of speeches included in the first cluster.

2. The server of claim 1, wherein the one or more computer programs further comprise computer-executable instructions that, when executed by the one or more processors, cause the server to:
identify respective feature points of the plurality of speeches, and
generate the plurality of clusters based on similarities between the respective feature points of the plurality of speeches.

3. The server of claim 1, wherein the one or more computer programs further comprise computer-executable instructions that, when executed by the one or more processors, cause the server to:
in response to at least one speech whose length is a preset value or more being included in the plurality of speeches, obtain respective parts of the at least one speech, and
generate the plurality of clusters based on similarities between the respective parts of the at least one speech, for the at least one speech.

4. The server of claim 1, wherein the one or more computer programs further comprise computer-executable instructions that, when executed by the one or more processors, cause the server to transfer the plurality of speeches for waking up the voice assistant feature to an automatic speech recognition (ASR) circuitry in response to the traffic being less than the preset value.

5. The server of claim 1, wherein the one or more computer programs further comprise computer-executable instructions that, when executed by the one or more processors, cause the server to transmit a command to increase a threshold for wakeup recognition during a preset time to a plurality of terminal devices individually corresponding to the plurality of speeches included in the first cluster.

6. The server of claim 5, wherein the one or more computer programs further comprise computer-executable instructions that, when executed by the one or more processors, cause the server to, in response to a false wakeup speech or sound being received from at least one terminal device among the plurality of terminal devices within the preset time, transmit a command to extend the preset time to the at least one terminal device.

7. The server of claim 1, wherein the one or more computer programs further comprise computer-executable instructions that, when executed by the one or more processors, cause the server to transmit response data for identifying whether to wake up to a plurality of terminal devices individually corresponding to the plurality of speeches included in the first cluster in response to the similarities between the plurality of speeches included in the first cluster falling within a second range lower than the first range.

8. The server of claim 7, wherein the one or more computer programs further comprise computer-executable instructions that, when executed by the one or more processors, cause the server to transfer the plurality of speeches to an automatic speech recognition (ASR) circuitry in response to the similarities between the plurality of speeches included in the first cluster falling within a third range lower than the second range.

9. The server of claim 1, wherein the one or more computer programs further comprise computer-executable instructions that, when executed by the one or more processors, cause the server to store feature points for the plurality of speeches included in the first cluster, as feature points of false wakeup speeches or sounds, in the memory.

10. A method for controlling a server, the method comprising:
in response to traffic of a plurality of speeches to wake up a voice assistant feature, received within a preset period being a preset value or more, generating a plurality of clusters based on similarities between the plurality of speeches; and
determining whether to respond to each of speeches included in each of the plurality of clusters based on similarities between the speeches included in each of the plurality of clusters,
wherein the determining of whether to respond comprises:
in response to similarities between a plurality of speeches included in a first cluster among the plurality of clusters falling within a first range not less than a preset value, determining the plurality of speeches included in the first cluster as false wakeup speeches or sounds; and
terminating a process without responding to the plurality of speeches included in the first cluster.

11. The method of claim 10, wherein the generating of the plurality of clusters comprises identifying respective feature points of the plurality of speeches and generating the plurality of clusters based on similarities between the respective feature points of the plurality of speeches.

12. The method of claim 10, wherein the generating of the plurality of clusters comprises:
in response to at least one speech whose length is a preset value or more being included in the plurality of speeches, obtaining respective parts of the at least one speech; and
generating the plurality of clusters based on similarities between the respective parts of the at least one speech, for the at least one speech.

13. The method of claim 10, further comprising storing feature points of the plurality of speeches included in the first cluster, as feature points of false wakeup speeches or sounds.

14. The method of claim 10, further comprising transferring the plurality of speeches for waking up the voice assistant feature to an automatic speech recognition (ASR) circuitry in response to the traffic being less than the preset value.

15. The method of claim 10, further comprising transmitting a command to increase a threshold for wakeup recognition during a preset time to a plurality of terminal devices individually corresponding to the plurality of speeches included in the first cluster.

16. The method of claim 15, further comprising, in response to a false wakeup speech or sound being received from at least one terminal device among the plurality of terminal devices within the preset time, transmitting a command to extend the preset time to the at least one terminal device.

17. The method of claim 10, wherein the determining of whether to respond comprises transmitting response data identifying whether to wake up to a plurality of terminal devices individually corresponding to the plurality of speeches included in the first cluster in response to the similarities between the plurality of speeches included in the first cluster falling within a second range lower than the first range.

18. The method of claim 17, wherein the determining of whether to respond comprises transferring the plurality of speeches to an automatic speech recognition (ASR) circuitry in response to the similarities between the plurality of speeches included in the first cluster falling within a third range lower than the second range.

19. One or more non-transitory computer-readable storage media storing computer-executable instructions that, when executed by one or more processors of a server, cause the server to perform operations, the operations comprising:
  in response to traffic of a plurality of speeches to wake up a voice assistant feature, received within a preset period being a preset value or more, generating a plurality of clusters based on similarities between the plurality of speeches; and
  determining whether to respond to each of speeches included in each of the plurality of clusters based on similarities between the speeches included in each of the plurality of clusters,
  wherein the determining of whether to respond comprises:
  in response to similarities between a plurality of speeches included in a first cluster among the plurality of clusters falling within a first range not less than a preset value, determining the plurality of speeches included in the first cluster as false wakeup speeches or sounds; and
  terminating a process without responding to the plurality of speeches included in the first cluster.

20. The one or more non-transitory computer-readable storage media of claim 19, wherein the generating of the plurality of clusters comprises identifying respective feature points of the plurality of speeches and generating the plurality of clusters based on similarities between the respective feature points of the plurality of speeches.

* * * * *